(12) United States Patent
Mano

(10) Patent No.: US 11,835,661 B2
(45) Date of Patent: Dec. 5, 2023

(54) AIMING ADJUSTMENT METHOD AND AIMING ADJUSTMENT APPARATUS FOR VEHICLE LAMP

(71) Applicant: KOITO MANUFACTURING CO., LTD., Tokyo (JP)

(72) Inventor: Mitsuharu Mano, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 625 days.

(21) Appl. No.: 17/052,071

(22) PCT Filed: Apr. 25, 2019

(86) PCT No.: PCT/JP2019/017643
§ 371 (c)(1),
(2) Date: Oct. 30, 2020

(87) PCT Pub. No.: WO2019/212033
PCT Pub. Date: Nov. 7, 2019

(65) Prior Publication Data
US 2021/0055395 A1 Feb. 25, 2021

(30) Foreign Application Priority Data

May 1, 2018 (JP) .................................. 2018-088087

(51) Int. Cl.
*G01B 7/31* (2006.01)
*G01S 7/497* (2006.01)
(Continued)

(52) U.S. Cl.
CPC .............. *G01S 7/497* (2013.01); *B60Q 1/068* (2013.01); *F21S 41/657* (2018.01); *G01M 11/06* (2013.01); *G01S 17/86* (2020.01); *G01S 17/88* (2013.01)

(58) Field of Classification Search
CPC .................................. G01B 7/31; G01B 11/27
(Continued)

(56) References Cited

U.S. PATENT DOCUMENTS

| 2,808,653 | A | * | 10/1957 | Hancke | ................ | G01M 11/067 356/121 |
| 3,822,944 | A | * | 7/1974 | Hopkins | ................... | G01C 9/28 33/366.11 |

(Continued)

FOREIGN PATENT DOCUMENTS

| CN | 102328616 A | 1/2012 |
| JP | S59147237 A | 8/1984 |

(Continued)

OTHER PUBLICATIONS

International Search Report issued in International Application No. PCT/JP2019/017643, dated Jun. 4, 2019 (2 pages).
(Continued)

*Primary Examiner* — George B Bennett
(74) *Attorney, Agent, or Firm* — Osha Bergman Watanabe & Burton LLP

(57) ABSTRACT

An aiming adjustment method for adjusting a posture of a vehicle lamp provided with a LIDAR device includes: providing a screen in front of the LIDAR device; detecting a state of a surface of the screen by the LIDAR device; detecting an angular error of the posture of the vehicle lamp based on a detection signal indicating the detected state of the surface; and correcting the posture of the vehicle lamp based on the angular error.

7 Claims, 10 Drawing Sheets

(51) Int. Cl.
*F21S 41/657* (2018.01)
*G01S 17/86* (2020.01)
*B60Q 1/068* (2006.01)
*G01M 11/06* (2006.01)
*G01S 17/88* (2006.01)

(58) Field of Classification Search
USPC .......................................................... 33/288
See application file for complete search history.

(56) References Cited

U.S. PATENT DOCUMENTS

| | | | | |
|---|---|---|---|---|
| 4,063,365 A * | 12/1977 | Hopkins | ............... | G01B 11/272 356/121 |
| 5,438,487 A * | 8/1995 | Schmid | .................. | B60Q 1/302 362/800 |
| 5,619,322 A * | 4/1997 | Murata | ................. | G01M 11/064 356/123 |
| 5,660,455 A * | 8/1997 | Tsukamoto | ............ | B60Q 1/068 362/284 |
| 5,707,133 A * | 1/1998 | Burton | ....................... | F16C 1/16 362/267 |
| 5,833,346 A * | 11/1998 | Denley | ................. | B60Q 1/0686 362/427 |
| 6,580,385 B1 | 6/2003 | Winner et al. | | |
| 7,513,663 B2 * | 4/2009 | Merchant | ............... | G01M 11/06 362/465 |
| 8,582,091 B2 * | 11/2013 | Ekladyous | ............. | G01B 21/24 356/121 |
| 8,767,186 B2 * | 7/2014 | Lu | ......................... | G01S 7/4865 356/4.01 |
| 10,047,925 B2 * | 8/2018 | Kim | ........................ | B60Q 1/143 |
| 10,052,998 B2 * | 8/2018 | Dudar | .................... | B60Q 1/076 |
| 10,227,032 B2 * | 3/2019 | Salter | ..................... | B60Q 1/068 |
| 10,414,453 B2 * | 9/2019 | Magill | ..................... | B60Q 1/04 |
| 10,451,236 B2 * | 10/2019 | Jo | .......................... | F21V 5/004 |
| 2010/0328644 A1 | 12/2010 | Lu et al. | | |
| 2011/0317439 A1 | 12/2011 | Yamazaki et al. | | |
| 2018/0045826 A1 | 2/2018 | Kasaba et al. | | |
| 2022/0091234 A1* | 3/2022 | Bennington | ............. | G01S 7/484 |
| 2023/0094908 A1* | 3/2023 | Ponier | .................. | G01M 11/062 356/121 |

FOREIGN PATENT DOCUMENTS

| | | |
|---|---|---|
| JP | 2003501635 A | 1/2003 |
| JP | 2016183918 A | 10/2016 |
| JP | 2017132408 A | 8/2017 |
| JP | 2018026305 A | 2/2018 |

OTHER PUBLICATIONS

Written Opinion issued in International Application No. PCT/JP2019/017643, dated Jun. 4, 2019 (4 pages).

Office Action issued in corresponding Chinese Application No. 201980029160.X; dated Jan. 24, 2022 (17 pages).

* cited by examiner

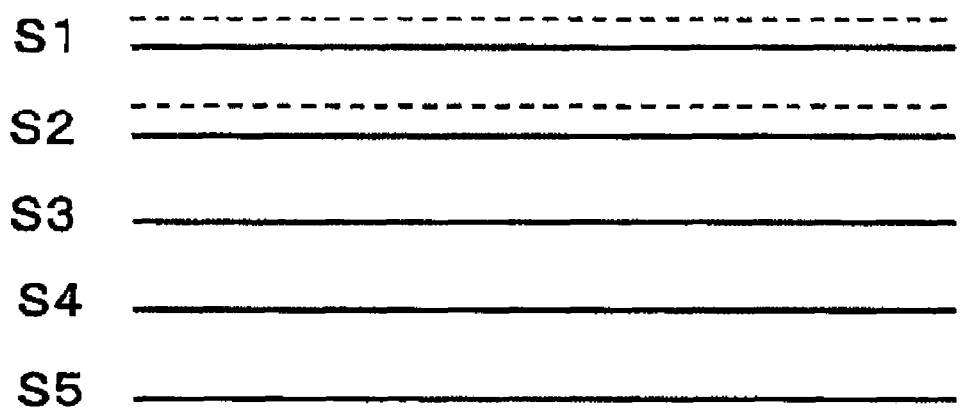

AIMING ADJUSTMENT METHOD AND AIMING ADJUSTMENT APPARATUS FOR VEHICLE LAMP

TECHNICAL FIELD

The present invention relates to an aiming adjustment method and an aiming adjustment apparatus for a vehicle lamp provided with a light detection and ranging (LIDAR) device.

BACKGROUND ART

As a headlamp of an automobile, there is proposed a headlamp capable of light distribution control (hereinafter, may be referred to as ADB control, or the like) such as adaptive driving beam (ADB) control and automatic high beam (AHB) control which partially shields an area of illumination so as to prevent an oncoming vehicle or a preceding vehicle from being dazzled while illuminating the other area in a wide range. In this type of headlamp, it is consider to provide a LIDAR device in the headlamp as a detecting device that detects an oncoming vehicle or a preceding vehicle. Further, it is also considered to perform control of automatic driving or the like as in Patent Document 1 using this LIDAR device.

CITATION LIST

Patent Document

Patent Document 1: JP-A-2017-132408

SUMMARY OF INVENTION

Technical Problem

In order to improve accuracy of the ADB control or the automatic driving control, it is necessary to mount a lamp unit and the LIDAR device in a lamp housing in a state where optical axis directions of the lamp unit and the LIDAR device are aligned with each other, and to assemble this headlamp to a vehicle body of a vehicle in a state of directing a correct direction. That is, when the headlamp is assembled to the vehicle body, it is necessary to perform aiming adjustment such that the lamp unit and the LIDAR device are directed in a predetermined direction.

In this aiming adjustment, an adjustment method may be considered in which a target serving as a reference position of the headlamp is provided on a screen provided in front of the headlamp, and a direction of the headlamp is adjusted while detecting the target with the LIDAR device. However, as a LIDAR device has a narrow detection range, the target may fall outside the detection range of the LIDAR device. In this case, proper aiming adjustment becomes difficult.

Specifically, when the detection range of the LIDAR device is deviated to an upper side or to a lower side than the target, it is necessary to adjust the direction of the headlamp in a direction opposite to the deviated direction. However, since the screen is formed of a surface extending in a vertical direction, a detected distance change amount is the same regardless of whether the LIDAR device is deviated to the upper side or to the lower side. Therefore, it is not possible to determine either one of up-down directions the headlamp is tilted only based on this detection output. The same applies when the LIDAR device performs detection while scanning in a horizontal direction, and it is difficult to determine an inclination in a roll direction of the headlamp around an optical axis.

Further, when that aiming adjustment method is applied to plural vehicles having different headlamp height positions, it is necessary to change the target of the screen according to the height positions. Therefore, aiming adjustment work becomes complicated when vehicles of different types are produced in line.

An object of the present invention is to provide an aiming adjustment method and an aiming adjustment apparatus capable of suitably performing aiming adjustment of a vehicle lamp.

Solution to Problem

An aiming adjustment method according to an embodiment of the present invention includes: providing a screen in front of a LIDAR device provided in a vehicle lamp; detecting a state of a surface of the screen by the LIDAR device; detecting an angular error of a posture of the vehicle lamp based on a detection signal indicating the state of the surface; and correcting the posture of the vehicle lamp based on the angular error.

An aiming adjustment apparatus according to an embodiment of the present invention includes: a screen provided in front of a LIDAR device provided in a vehicle lamp; and a diagnostic device configured to detect an angular error of a posture of the vehicle lamp based on a detection signal detected by the LIDAR device, the detection signal indicating a state of a surface of the screen.

According to an embodiment of the present invention, as a method of detecting the state of the surface of the screen, it may be advantageous that a surface of the screen facing the LIDAR device is inclined with respect to a vertical direction, and the angular error is detected based on a target distance set to the screen and a distance between the LIDAR device and the screen detected by the LIDAR device. Alternatively, it may be advantageous that a different reflection portion is provided on the surface of the screen facing the LIDAR device, and the angular error is detected based on a change timing of a signal level of the detection signal.

Advantageous Effects of Invention

According to an embodiment of the present invention, by detecting the state of the surface of the screen facing the LIDAR device, especially a distance from the LIDAR device to the surface of the screen or a reflection state of the surface of the screen, an inclination of the LIDAR device, that is, an inclination of a lamp can be detected, and therefore aiming adjustment can be performed with high accuracy even in a vehicle lamp provided with a LIDAR device having a narrow detection range.

BRIEF DESCRIPTION OF DRAWINGS

FIG. 9C is a signal waveform diagram when a reference direction of a LIDAR device is tilted downward from a state of FIG. 9A.

DESCRIPTION OF EMBODIMENTS

First Embodiment

Figure 1:
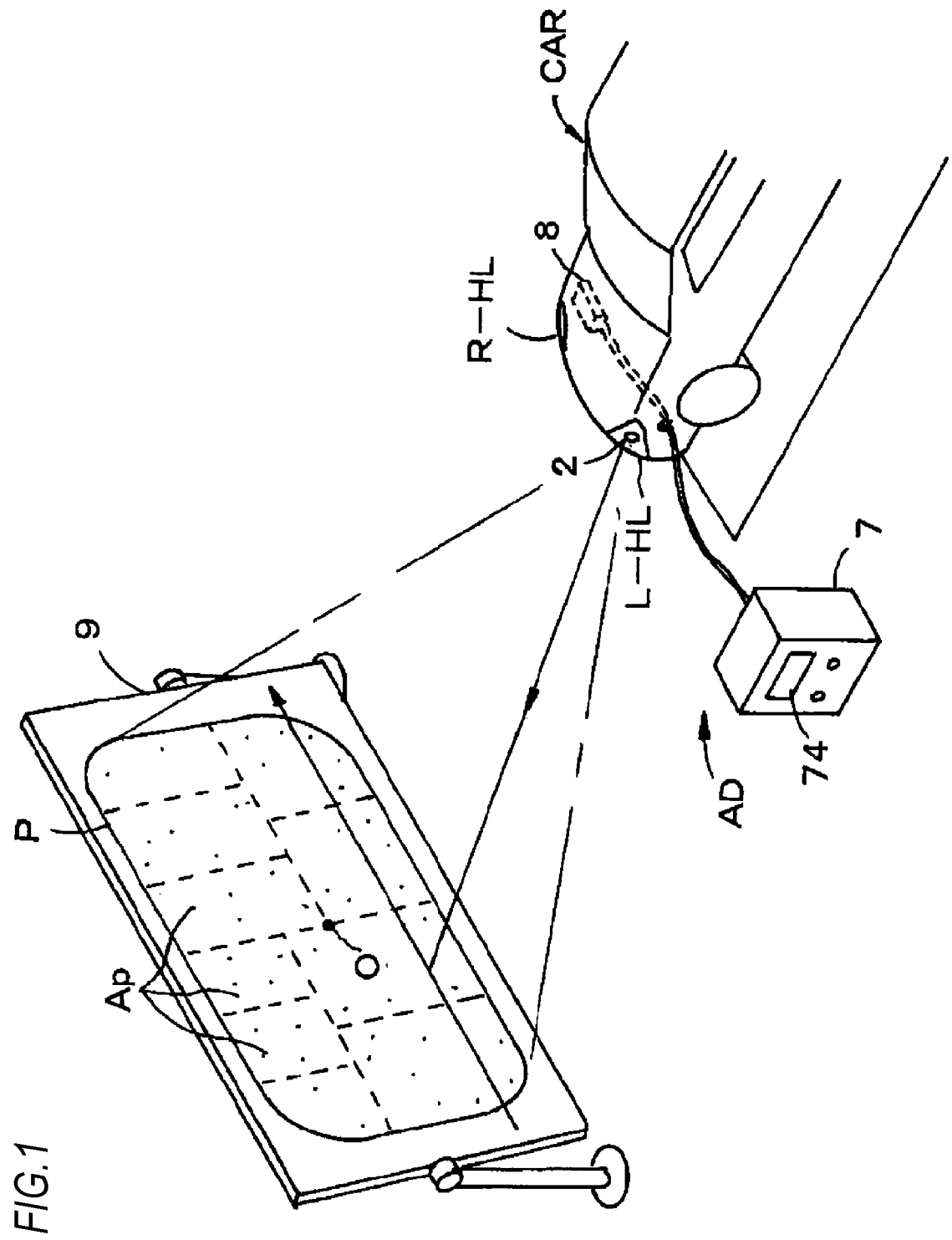
FIG. 1 is a conceptual configuration diagram of an aiming adjustment apparatus according to a first embodiment of the present invention.

Next, embodiments of the present invention will be described with reference to the drawings. FIG. 1 is a conceptual configuration diagram of a first embodiment in which the present invention is applied to an aiming adjustment apparatus AD for a headlamp HL of an automobile. Each of left and right headlamps HL (L-HL, R-HL) of an automobile CAR is mounted with a lamp unit capable of ADB control, and a LIDAR device 2 for detecting a target object such as an oncoming vehicle in a front area of the automobile CAR, as will be described later. The aiming adjustment apparatus AD is configured to illuminate a screen 9 with light emitted from lamp units of these headlamps HL to check a light distribution pattern P, and to perform aiming adjustment of the lamp units using the LIDAR device 2.

Figure 2:
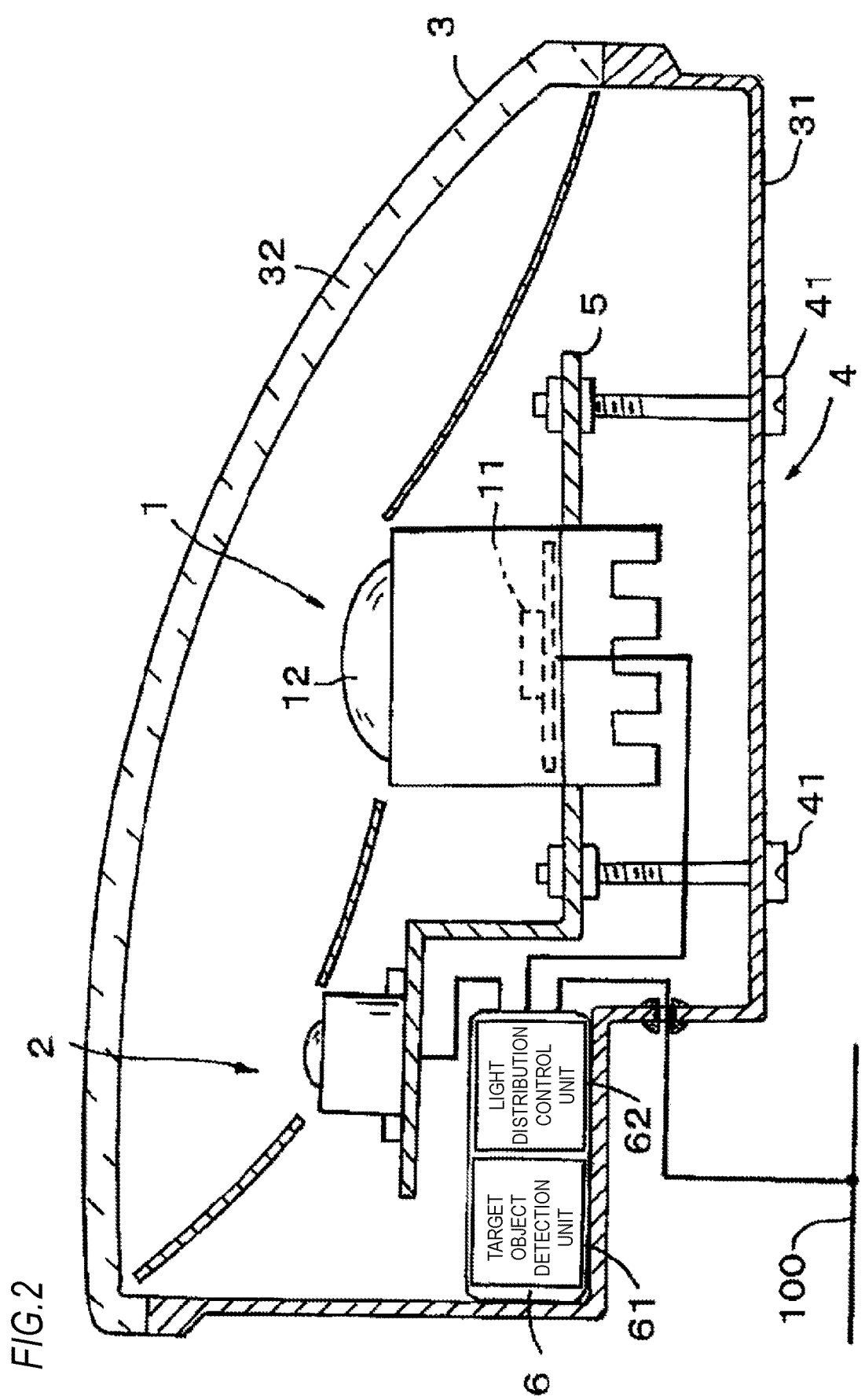
FIG. 2 is a schematic horizontal sectional view of a headlamp.

FIG. 2 is a schematic horizontal sectional view of the right headlamp R-HL. A lamp housing 3 of the right headlamp R-HL includes a lamp body 31 and a light-transmitting front cover 32. A base plate 5 is supported by an aiming mechanism 4 on the lamp body 31. A lamp unit 1 and the LIDAR device 2 are attached to the base plate 5. A direction of an optical axis (hereinafter, referred to as an optical axis direction) of the lamp unit 1 and a direction serving as a reference (hereinafter, referred to as a reference direction) when the LIDAR device 2 performs detection are directed in directions having a predetermined relationship with each other, and are directed in the same direction in an example of FIG. 2.

The lamp unit 1 includes a light source 11 including a plurality of light emitting diodes (LEDs), for example. By causing all or a selected part of the plurality of LEDs (the light source 11) to emit light and projecting the emitted light by a projection lens 12 in the front area of the automobile, light illumination can be performed in a desired light distribution pattern. For example, as shown in FIG. 1, each light emitting area of the plurality of LEDs is set to illuminate a predetermined divided area Ap in the front area of the automobile CAR, respectively, and only a divided area Ap corresponding to the selected and emitting LED is illuminated. Therefore, when all the LEDs emit light, an entire area of the light distribution pattern P is illuminated. A divided area Ap corresponding to a turn-off LED is not illuminated. Therefore, for example, by turning off an LED corresponding to an area where an oncoming vehicle or a preceding vehicle is detected, these vehicles can be prevented from being dazzled.

In the example of FIG. 2, the LIDAR device 2 is a small one that can be mounted in the lamp housing 3. A detection range of the small LIDAR device 2, particularly a detection range in an up-down direction is limited. A description of a specific structure of the LIDAR device 2 is omitted. The LIDAR device 2 moves the reference direction in a vertical direction at a predetermined interval and simultaneously performs scanning in a horizontal direction with emitted laser light. Then, the LIDAR device 2 receives reflected light that is reflected by a preceding vehicle, an oncoming vehicle, a road surface condition, or the like as the target object and outputs a distance signal to the target object.

In this headlamp R-HL, an aiming screw 41 of the aiming mechanism 4 supporting the base plate 5 on the lamp housing 3 can be axially operated manually or by a motor or the like. By this axial operation, the base plate 5 is tilted in the up-down direction and a left-right direction, the optical axis direction of the lamp unit 1 and the reference direction of the LIDAR device 2 are adjusted in the up-down direction and the left-right direction, and the aiming adjustment in a pitch direction and the roll direction of the headlamp R-HL can be performed. Since the aiming mechanism 4 including such an aiming screw 41 is known, a detailed description thereof will be omitted.

A lamp electronic control unit (ECU) 6 is mounted in the lamp housing 3. The lamp unit 1 and the LIDAR device 2 are electrically connected to the lamp ECU 6. The lamp ECU 6 is connected to a signal bus of an electric control system of the automobile CAR and is connected to a controller area network (CAN) 100 in the example of FIG. 2.

As shown in FIG. 2, the lamp ECU 6 includes a target object detection unit 61 that detects a target object such as an oncoming vehicle based on a detection signal output from the LIDAR device 2, and a light distribution control unit 62 for controlling light distribution of the lamp unit 1 with respect to the detected target object. This detection signal is the distance signal representing a distance from the LIDAR device 2 to a detection target, and in the first embodiment, is a distance signal from the LIDAR device 2 to the screen 9.

The target object detection unit 61 obtains an image signal representing a shape of the target object by performing signal processing on the detection signal output from the LIDAR device 2. The light distribution control unit 62 recognizes the target object based on the image signal from the target object detection unit 61. The light distribution control unit 62 sets an appropriate light distribution pattern such that the recognized target object, that is, the oncoming vehicle is not dazzled, and also generates an ADB control signal for generating this light distribution pattern. Then, the light distribution control unit 62 controls light emission of the light source 11 of the lamp unit 1, that is, the plurality of LEDs, based on the generated ADB control signal.

A configuration of the left headlamp L-HL is similar to that of the right headlamp R-HL, except that arrangement of the lamp unit 1 and the LIDAR device 2 inside the lamp housing 3 is symmetrical with a configuration of FIG. 2.

The headlamps HL (L-HL, R-HL) are respectively assembled on left and right sides of a front part of a vehicle body in an automobile assembly process. After this assembly, the aiming adjustment apparatus AD performs the aiming adjustment on the headlamps HL. By this aiming adjustment, the optical axis direction of the lamp unit 1 and the reference direction of the LIDAR device 2 are set to predetermined directions, and highly accurate ADB control by the headlamps HL can be realized. In addition, when the detection signal of the LIDAR device 2 is used for automatic driving control, highly accurate automatic driving control or the like can be realized.

As shown in FIG. 1, the aiming adjustment apparatus AD includes the screen 9 provided in front of the automobile CAR, a diagnostic device 7 which receives the detection signal of the screen 9 detected by the LIDAR device 2 mounted in the headlamps HL of the automobile CAR and performs a required calculation, and an actuator 8 controlled by the diagnostic device 7 to adjust the aiming mechanism 4 of the headlamps HL.

Figure 3:
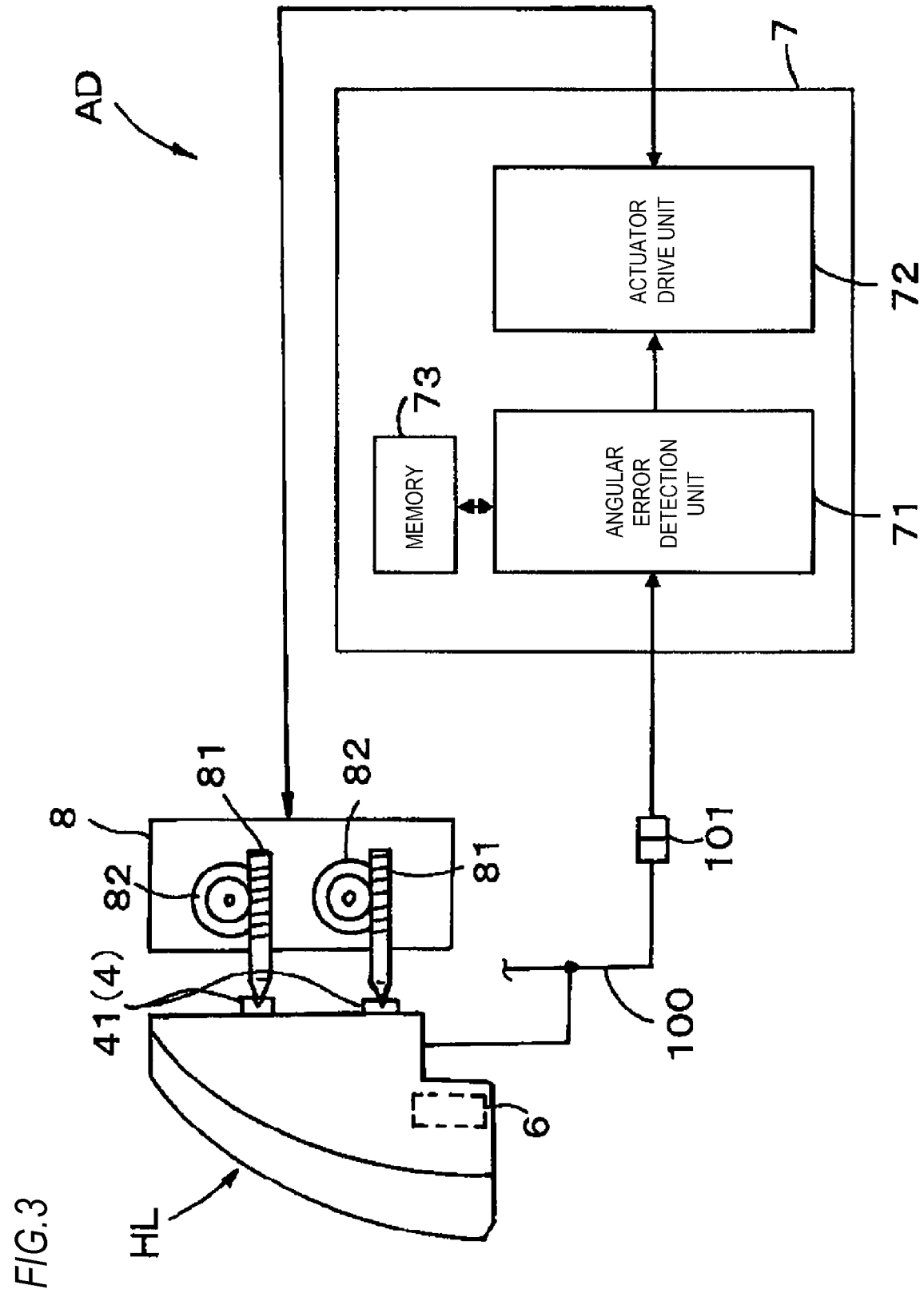
FIG. 3 is a block configuration diagram of a diagnostic device and an actuator.

FIG. 3 is a block configuration diagram of the diagnostic device 7 and the actuator 8. The actuator 8 includes a driver head 81 connected to the aiming screw 41 of the aiming mechanism 4 of the headlamp HL, and a motor mechanism 82 that axially drives the driver head 81. The motor mechanism 82 is rotated in a normal direction or a reverse direction to axially drive the driver head 81, so that the aiming screw 41 is axially operated, and the base plate 5 is tilted to perform an angle adjustment of the lamp unit 1 and the LIDAR device 2, that is, to perform the aiming adjustment of the headlamp HL.

The diagnostic device 7 includes an angular error detection unit 71 that detects an inclination of the headlamp HL from the predetermined direction as an angular error, and an actuator drive unit 72 that controls the actuator 8 based on the angular error detected by the angular error detection unit 71. In the first embodiment, the diagnostic device 7 can be electrically connected to the CAN 100 by using a connector 101 provided on the automobile CAR. The diagnostic device 7 can receive a signal from the lamp ECU 6, or the detection signal output from the LIDAR device 2 in the first embodiment, via the CAN 100. Then, the angular error detection unit 71 can detect the angular error of the headlamp HL with respect to a correct reference direction, based on the input detection signal.

The actuator drive unit 72 of the diagnostic device 7 feedback-controls the motor mechanism 82 of the actuator 8 based on the angular error detected by the angular error detection unit 71 such that the angular error becomes zero. By this control, the actuator 8 adjusts postures of the lamp unit 1 and the LIDAR device 2, so that the aiming adjustment of the headlamp HL is performed.

Figure 4:
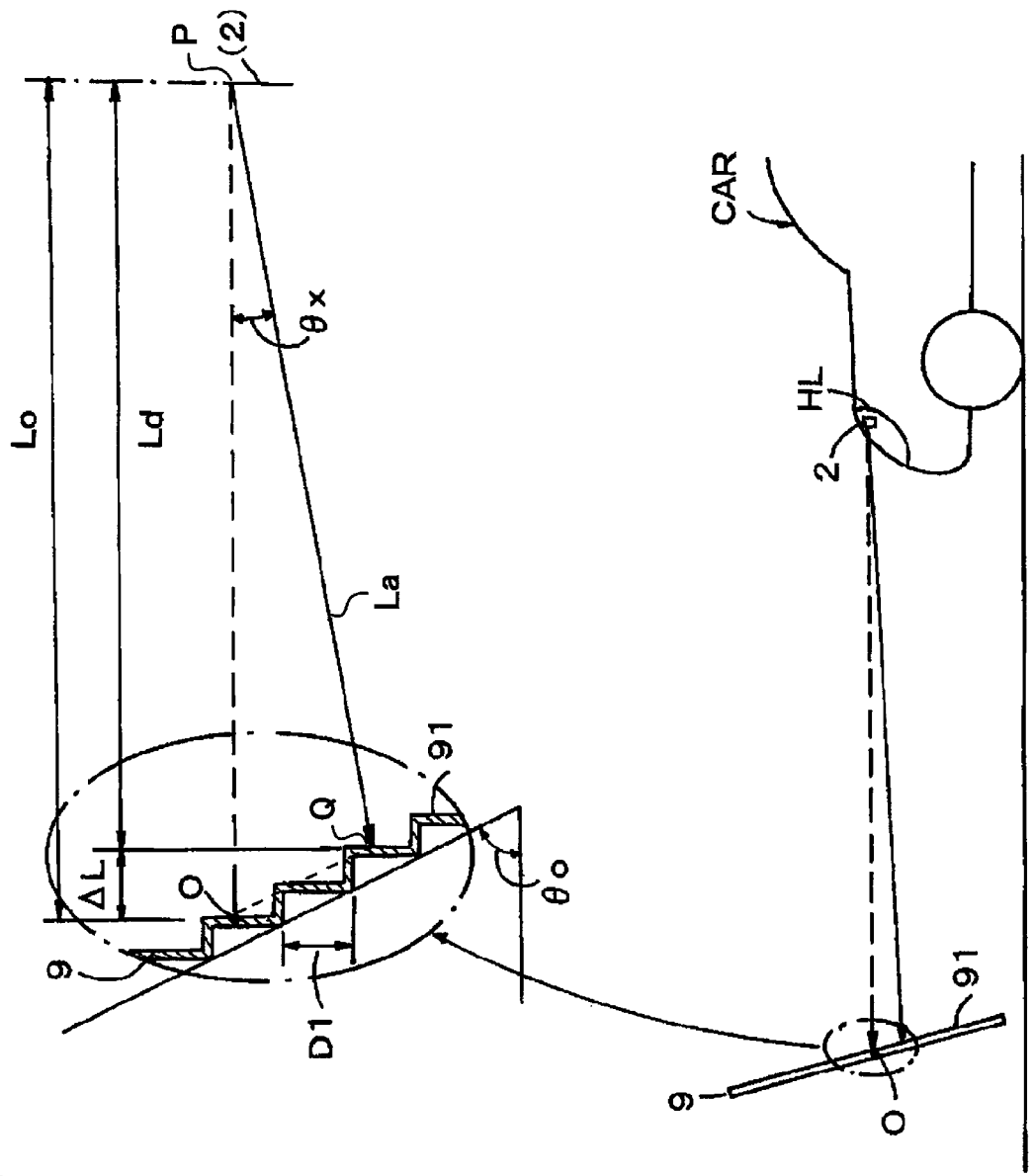
FIG. 4 is a side schematic diagram for illustrating aiming adjustment.

As shown in a side view of FIG. 4, the screen 9 is formed of a plate-shaped member having required vertical and horizontal dimensions. A surface 91 of the screen 9 on a side facing the headlamp HL subjected to the aiming adjustment is inclined at a predetermined inclination angle $\theta o$. In an example of FIG. 4, the surface 91 is formed as a stepped surface that is inclined stepwise rearward when viewed from a headlamp HL side. A step dimension D1 of the stepped surface is a dimension longer than a minimum distance resolution of the LIDAR device 2 in the vertical direction, and may be advantageously set to twice or more the minimum distance resolution. For example, the minimum distance resolution of the LIDAR device 2 of the first embodiment is 3 cm, and the stepped surface having the step dimension D1 of 6 cm or more is formed in the surface 91.

The inclination angle $\theta o$ of the screen 9 is stored in a memory 73 provided in the diagnostic device 7.

A target O for the aiming adjustment of the headlamp HL is set on the screen 9. The target O is set on the surface 91 of the screen 9 and is set as a portion corresponding to a position separated from the headlamp HL by a predetermined distance Lo. This predetermined distance Lo is defined as a target distance. This target distance Lo is also stored in the memory 73 of the diagnostic device 7.

An aiming adjustment method using the aiming adjustment apparatus AD including the above configuration will be described. As shown in FIG. 1, the automobile CAR to which the headlamp HL for the aiming adjustment is assembled is provided at a predetermined position and in a predetermined posture. This position is a position facing the surface 91 of the screen 9 and is a position where the headlamp HL, specifically, the LIDAR device 2 is located at the position separated from the target O set on the screen 9 by the target distance Lo. Then, when the diagnostic device 7 is started, a predetermined command is transmitted from the diagnostic device 7 to the CAN 100, and the lamp ECU 6 enters a diagnostic mode. At the same time, the actuator 8 is also set to standby.

Once entering the diagnostic mode, the lamp ECU 6 causes the LIDAR device 2 to detect the screen 9. The LIDAR device 2 horizontally scans substantially an entire width of the surface 91 of the screen 9 in a horizontal direction with the laser light to detect the screen 9. This horizontal scanning is performed at a predetermined interval and a predetermined range in the vertical direction. The detection signal output from the LIDAR device 2, that is, the distance signal is output to the target object detection unit 61 of the lamp ECU 6 and also to the CAN 100 at the same time. Then, this distance signal is input to the diagnostic device 7 connected to the CAN 100 via the connector 101.

The angular error detection unit 71 of the diagnostic device 7 analyzes the input detection signal and detects a detection distance Ld based on a distance La to the screen 9, as described later. Then, the detection distance Ld is compared with the target distance Lo to the target O on the screen 9, and when the detection distance Ld and the target distance Lo are different, a distance error $\Delta L$ thereof is calculated. Further, an angular error $\theta x$ in the vertical direction between a direction (a target direction) in which the LIDAR device 2 is to direct the target O and a direction in which the reference direction of the LIDAR device 2 is actually directed is calculated. That is, the angular error $\theta x$ is an angular error between a correct direction of the headlamp HL and a current direction of the headlamp HL, and is an error of an aiming angle of the headlamp HL.

As shown in a partially enlarged view in FIG. 4, the surface 91 of the screen 9 is a stepped surface having the predetermined inclination angle $\theta o$ with respect to the horizontal direction, but is assumed to be an approximately flat surface, and the angular error $\theta x$ between the target direction and the actual reference direction of the LIDAR device 2 can be calculated using trigonometry based on this inclination angle $\theta o$. Although the details are omitted, a position of the LIDAR device 2 is set as a point P, and a point Q on the screen 9 which is separated from the point P by the distance La is obtained. Then, the angular error $\theta x$ can be detected according to cosine formula based on a triangle POQ formed of these points P and Q and the target O, and the inclination angle $\theta o$ which is one internal angle of the triangle. The detection distance Ld can be detected from this triangle POQ.

At the same time, the angular error detection unit 71 detects whether a detection direction of the LIDAR device 2 is deviated from the target O toward an upper side or a lower side and detects an angular error direction from the distance error ΔL between the detection distance Ld and the target distance Lo. In this detection, magnitudes of the detection distance Ld and the target distance Lo are compared. Since the surface 91 of the screen 9 is formed as the stepped surface inclined rearward, when the detection distance Ld is shorter than the target distance Lo, a lower side area of the target O is detected, and it is detected as inclining downward. On the contrary, when the detection distance Ld is longer than the target distance Lo, an upper side area of the target O is detected, and it is detected as inclining upward.

Incidentally, when the surface of the screen 9 is the flat surface parallel to the vertical direction (orthogonal to the horizontal direction), even if the detection range of the LIDAR device 2 deviates from the target O to either the upper side or the lower side, the detection distance Ld is still larger than the target distance Lo. Therefore, even when the detection distance Ld and the target distance Lo are compared, it cannot be determined whether the LIDAR device 2 is tilted upward or downward, and it becomes difficult to perform appropriate aiming adjustment.

The angular error detection unit 71 outputs the detected angular error θx and the angular error direction to the actuator drive unit 72. The actuator drive unit 72 feedback-controls the actuator 8 such that the angular error θx becomes zero. Accordingly, in the actuator 8, the driver head 81 is axially driven by the motor mechanism 82. Then, the aiming screw 41 connected to the driver head 81 is axially operated to tilt the base plate 5 in the up-down direction. Therefore, the angular error between the reference direction of the LIDAR device 2 and the target direction becomes zero, so that the aiming adjustment is performed, and at the same time, the optical axis direction of the lamp unit 1 is directed to the target. As described above, the aiming adjustment in the pitch direction is performed.

After performing the above aiming adjustment, if necessary, the detection in the LIDAR device 2 may be performed again, so as to confirm that the angular error θx between the target direction and the direction where the reference direction of the LIDAR device 2 is actually directed is zero.

The aiming adjustment is performed for each of the left and right headlamps. However, when the automobile CAR is not provided in a state of correctly facing the surface 91 of the screen 9 in a yaw direction, an aiming adjustment error in the yaw direction may occur. Therefore, detection distances Ld detected by respective LIDAR devices 2 of the left and right headlamps HL are compared, and when a difference between the two detection distances Ld is equal to or more than a predetermined value, it is determined that the aiming adjustment is defective. In this case, it is preferable to correct the posture or the like of the automobile CAR by issuing a warning in the diagnostic device 7.

In a case of performing the aiming adjustment on an automobile having different headlamp assembly heights, it is necessary to change a height position of the target O on the screen 9. In this case, the target distance Lo set in the memory 73 of the diagnostic device 7 is changed. By changing the target distance Lo, the height position of the target O on the surface 91 of the inclined screen 9 is also necessarily changed. By performing the same aiming adjustment based on the changed target, the aiming adjustment for different vehicle types can also be easily performed.

The angular error detection unit 71 provided in the diagnostic device 7 may be built in the lamp ECU 6. That is, the angular error θx associated with an error between the target distance Lo and the detection distance Ld may be output from the lamp ECU 6 to the CAN 100. In this case, the diagnostic device 7 may only include the actuator drive unit 72. Further, the actuator drive unit 72 may be integrally provided in the actuator 8. In this case, it is not necessary to configure the diagnostic device 7 as an independent device, and the aiming adjustment apparatus can be simplified.

The diagnostic device 7 may be configured to display the detected angular error and angular error direction on a display device 74 (see FIG. 1). In this case, an operator manually operates the aiming screw 41 to perform the aiming adjustment while visually checking a display on the display device 74. In this case, the actuator 8 can be omitted, and the aiming adjustment apparatus can be further simplified.

In the first embodiment, the surface 91 of the screen 9 is formed as the stepped surface inclined rearward when viewed from the automobile CAR, but may also be formed as a stepped surface inclined forward when viewed from the automobile CAR. Further, when a high-performance LIDAR device having an extremely small minimum distance resolution is used, the surface of screen may be formed as a flat surface.

Second Embodiment

In the first embodiment, the aiming adjustment in the pitch direction of the automobile is performed, and a dedicated screen 9 is required since the surface 91 of the screen 9 is formed into the stepped surface and is inclined at the predetermined inclination angle θo. In the second embodiment, the aiming adjustment in the roll direction of the automobile is performed, and the screen 9 is simplified.

Figure 5:
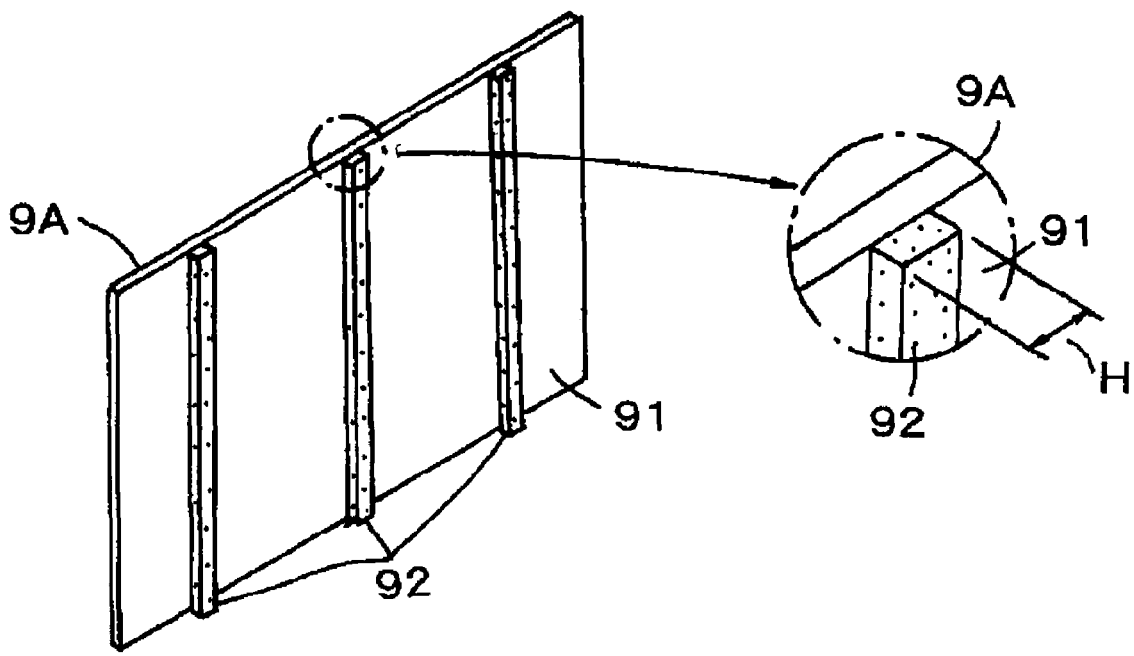
FIG. 5 is a schematic perspective view of a screen according to a second embodiment.

In an aiming adjustment apparatus of the second embodiment, as shown in FIG. 5, a flat screen 9A whose surface 91 is parallel to the vertical direction is used. A plurality of column members 92 are attached in a striped form on the surface 91 of the screen 9A. The column members 92 are formed of a member having a reflectance lower than that of the surface 91 of the screen 9A. A dimension H of the column member 92 in the horizontal direction is at least twice the minimum distance resolution of the LIDAR device 2 in the horizontal direction.

With the use of the screen 9A, when the LIDAR device 2 performs horizontal scanning with the laser light, reflection of the laser light is reduced by the column member 92, and an amount of reflected light is lower than that on the reflection on the surface 91 of the screen 9A. Therefore, the detection signal of the LIDAR device 2 corresponding to a line when horizontally scanning with the laser light (hereinafter referred to as a horizontal scanning line) is a signal whose signal level is lowered at a timing of scanning the column members 92.

Figure 6A:
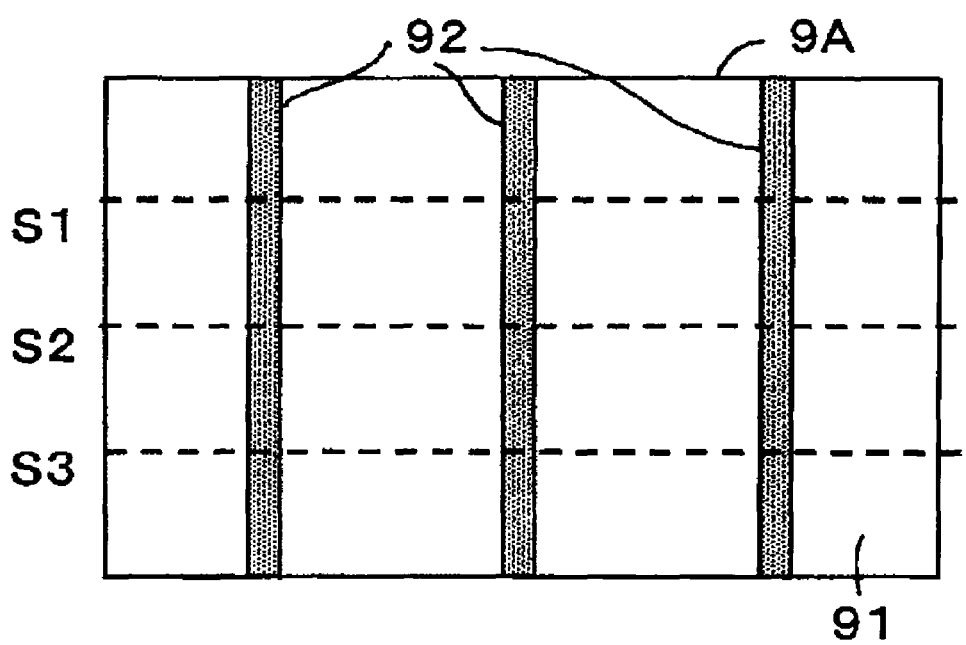
FIG. 6A is a schematic front view of the screen according to the second embodiment.
Figure 6B:
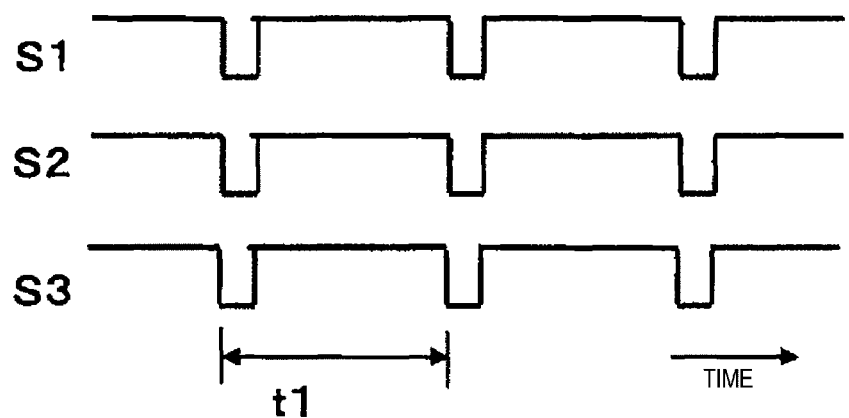
FIG. 6B is a signal waveform diagram corresponding to FIG. 6A.

For example, as shown in FIG. 6A, when the LIDAR device 2 is not tilted in the roll direction, three horizontal scanning lines S1 to S3 are scanned in a direction orthogonal to the column members 92. At this time, as shown in FIG. 6B, detection signals are continuously at a high level while the signal levels decrease at timings of scanning the column members 92 along a time axis. In this way, when the LIDAR device 2 is not tilted in the roll direction, the timings at which the signal levels of the detection signals of the three horizontal scanning lines S1 to S3 decrease are the same.

Figure 6C:
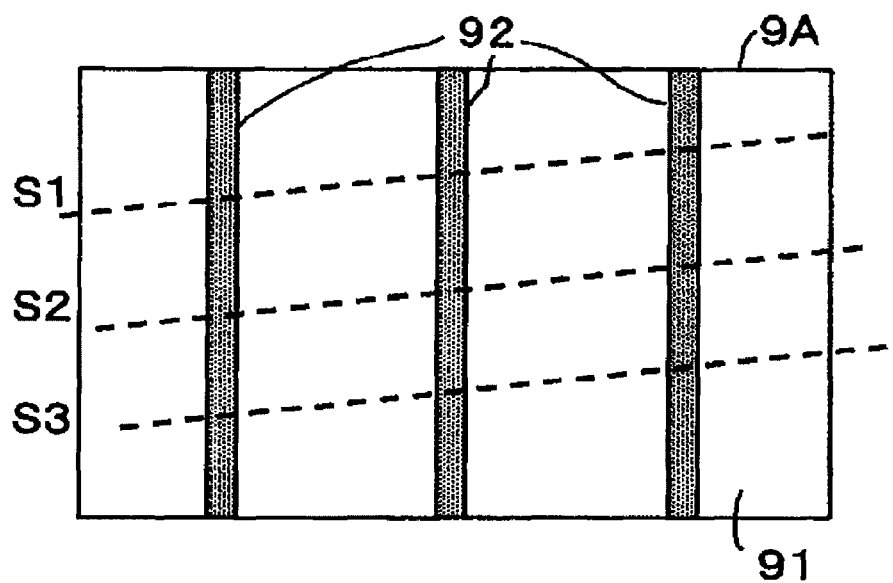
FIG. 6C is a schematic front view of the screen according to the second embodiment.
Figure 6D:
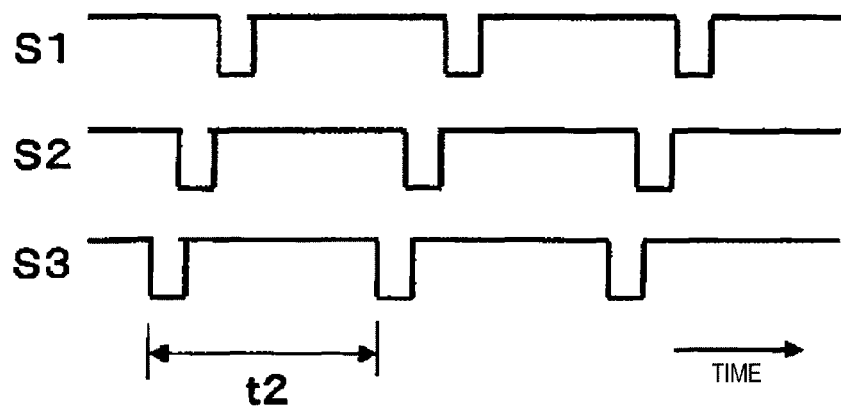
FIG. 6D is a signal waveform diagram corresponding to FIG. 6C.

When the LIDAR device 2 is tilted in the roll direction, as shown in FIG. 6C, the three horizontal scanning lines S1 to S3 intersect the column member 92 in an oblique direction. Therefore, the detection signals at this time are as shown in FIG. 6D. That is, the timings at which the signal levels of the detection signals of the three horizontal scanning lines S1 to S3 decrease gradually deviate back and forth on the time axis. For example, as shown in FIG. 6C, when the LIDAR device 2 is tilted in an upward right direction, a decreasing timing becomes earlier as a scanning position lowers. In addition, an inclination angle of the LIDAR device 2 can be detected from a timing deviation time.

Then, the angular error detection unit 71 of the diagnostic device 7 detects the angular error in the roll direction from this inclination angle. That is, in the second embodiment, by detecting the column members 92 of the screen 9A with the horizontal scanning lines, a state of the surface 91 of the screen 9A, here, portions whose reflectance is different from that of the surface 91 are detected, and the angular error is detected.

The actuator drive unit 72 can perform the aiming adjustment of the LIDAR device 2, that is, the aiming adjustment of the headlamp HL by controlling the actuator 8 based on this angular error. Alternatively, the angular error and the direction detected by the diagnostic device 7 are displayed on the display device 74, and the aiming adjustment can be performed manually.

As can be determined by comparing FIG. 6B and FIG. 6D, a time interval t1, t2 between the timings at which the signal level of the detection signal decrease also changes depending on whether the LIDAR device 2 is tilted in the roll direction. Therefore, the angular error detection unit 71 of the diagnostic device 7 can also detect the angular error by which the LIDAR device 2 is tilted in the roll direction based on the change of the time intervals t1 and t2 of the timings.

In the second embodiment, the actuator drive unit 72 of the diagnostic device 7 can perform the aiming adjustment in the roll direction of the LIDAR device 2, that is, the headlamp HL by controlling the actuator 8 based on this angular error. Alternatively, the angular error and the direction are displayed on the diagnostic device 7, and the aiming adjustment can be performed manually.

Figure 7:
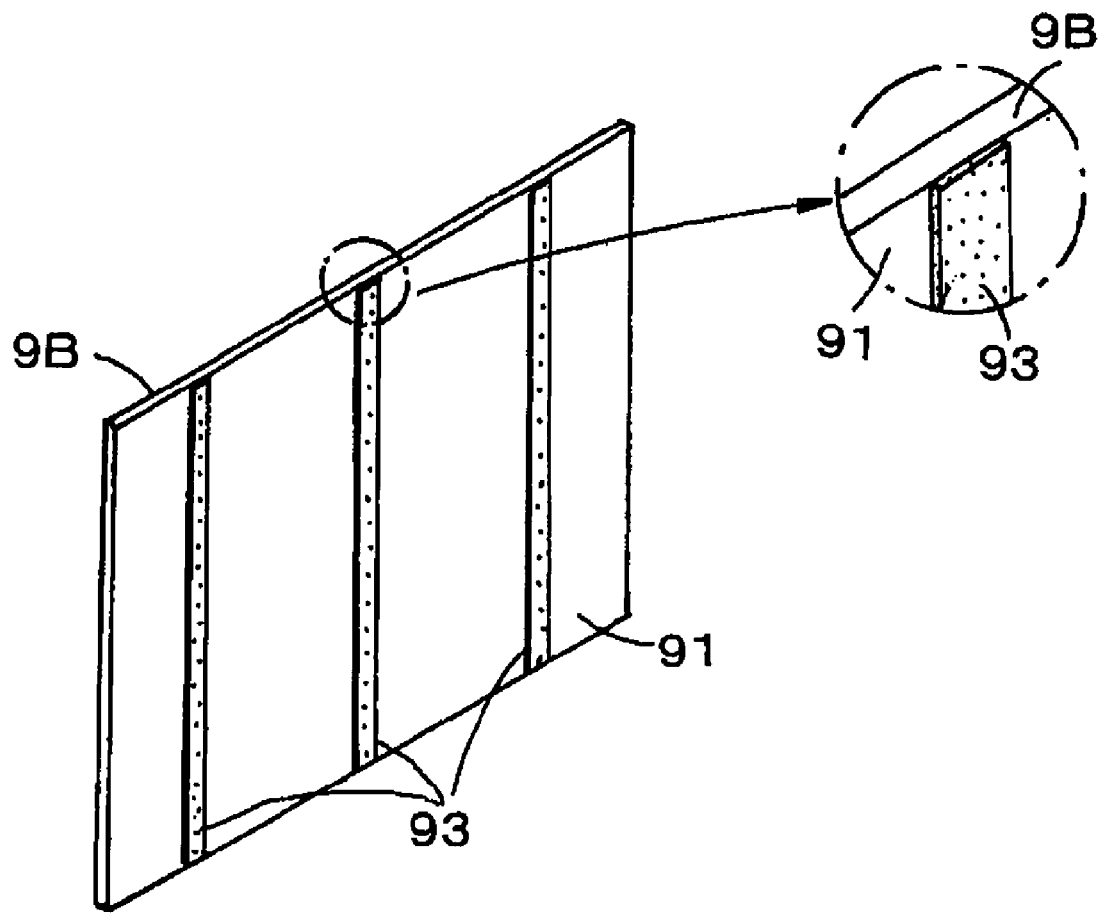
FIG. 7 is a schematic perspective view of a screen according to a modification of the second embodiment.

Here, as shown in FIG. 7, instead of the column members 92 provided on the screen 9A, a screen 9B may be formed by attaching low reflectance tapes 93 having a band shape with a low light reflectance in the striped form. When the low reflectance tape 93 is used, the screen 9B can be formed more easily than when the column member 92 is attached. In addition, by forming a plurality of low reflectance tapes 93 with tapes having different reflectances, the timing at which the signal level of the detection signal of each of the plurality of horizontal scanning lines decrease can be clearly recognized, and the timing can be easily detected. In this case, the low reflectance tape 93 of the screen 9B is also detected by the horizontal scanning lines, a surface state of the screen 9B is detected, and the angular error is detected.

In the second embodiment, when the high-performance LIDAR device 2 having the small minimum distance resolution is used, since an inclination of the surface 91 of the screen 9A or 9B can be detected from the detection signal, the aiming adjustment in the pitch direction can be performed by arranging the screen 9A or 9B in a state of being tilted forward or backward similarly to the first embodiment.

Third Embodiment

Figure 8A:
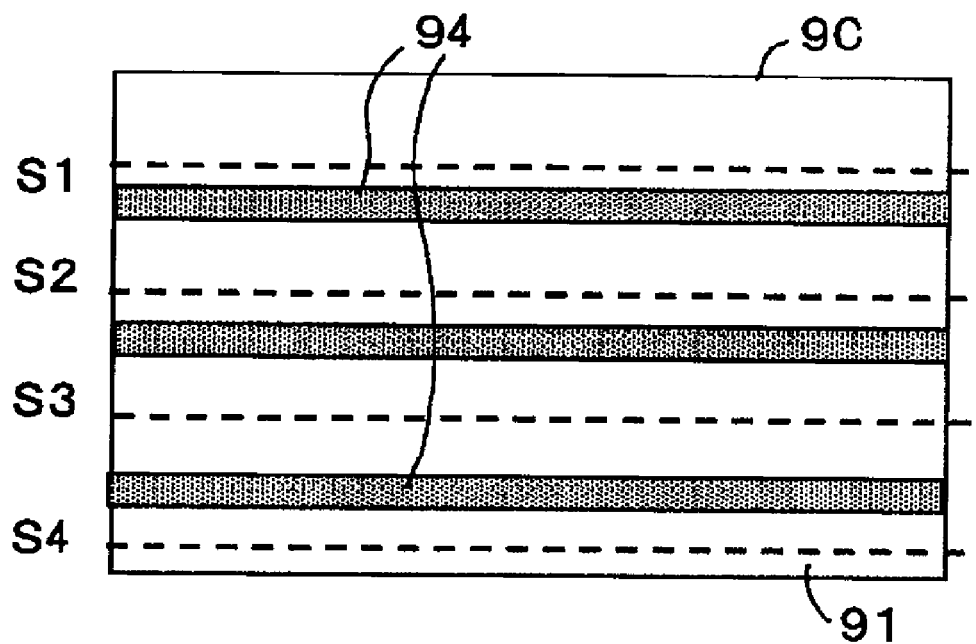
FIG. 8A is a schematic front view of a screen according to a third embodiment.

A third embodiment is the aiming adjustment that performs the aiming adjustment in the roll direction, as in the second embodiment. As shown in FIG. 8A, a screen 9C is used in which a plurality of low reflectance tapes 94 having a belt shape are attached side by side in the vertical direction to the surface 91 so as to extend in the horizontal direction. An interval dimension of the plurality of low reflectance tapes 94 in the vertical direction is approximately equal to the minimum distance resolution of the LIDAR device 2 in the vertical direction.

When the aiming adjustment is performed using the screen 9C, the signal levels of the detection signals become high when horizontal scanning lines S1 to S4 of the LIDAR device 2 are reflected by the surface 91 of the screen 9C. Although not shown, when the horizontal scanning line overlap with the low reflectance tape 94, a signal level of the detection signal decreases.

Figure 8B:
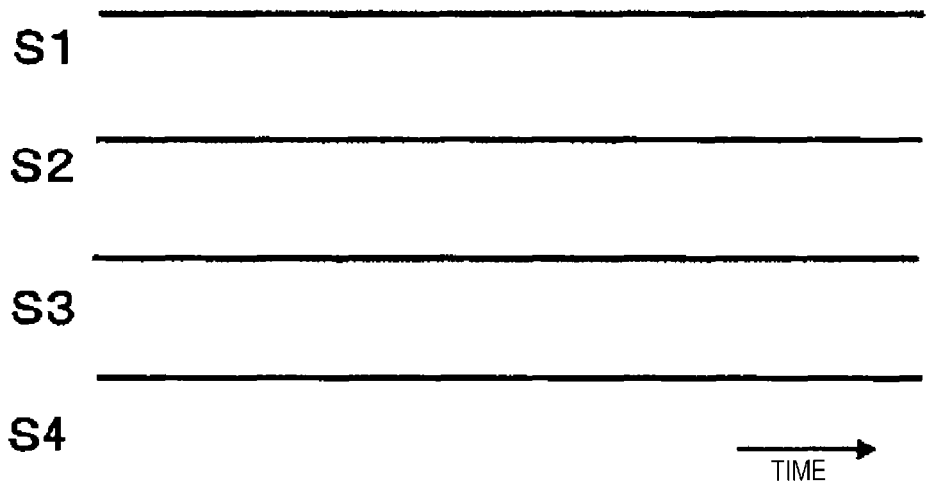
FIG. 8B is a signal waveform diagram corresponding to FIG. 8A.

Therefore, as shown in FIG. 8A, when the LIDAR device 2 is not inclined in the roll direction, the horizontal scanning lines S1 to S4 do not overlap the low reflectance tapes 94. Therefore, as shown in FIG. 8B, the respective detection signals are signals continuous in the horizontal direction.

Figure 8C:
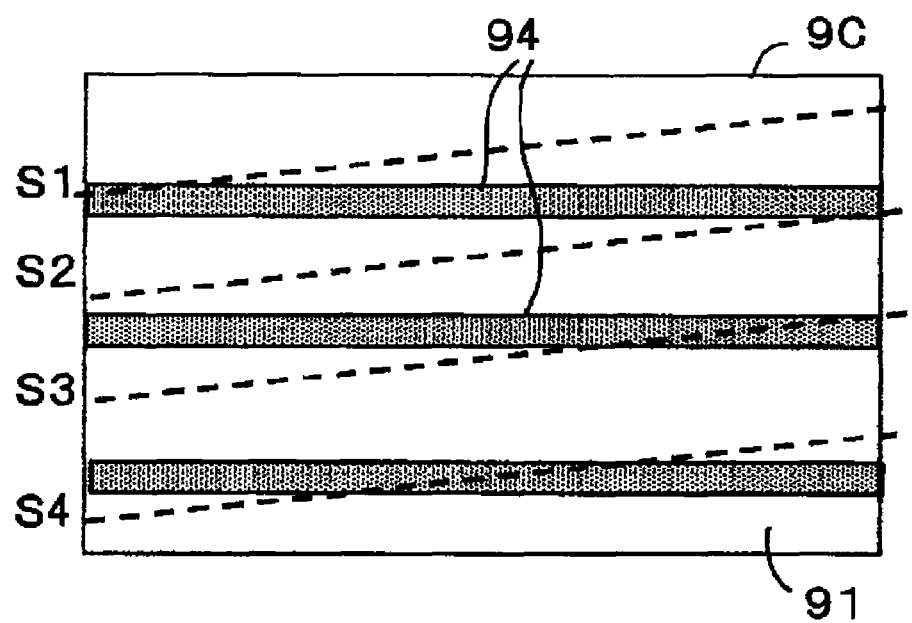
FIG. 8C is a schematic front view of the screen according to the third embodiment.
Figure 8D:
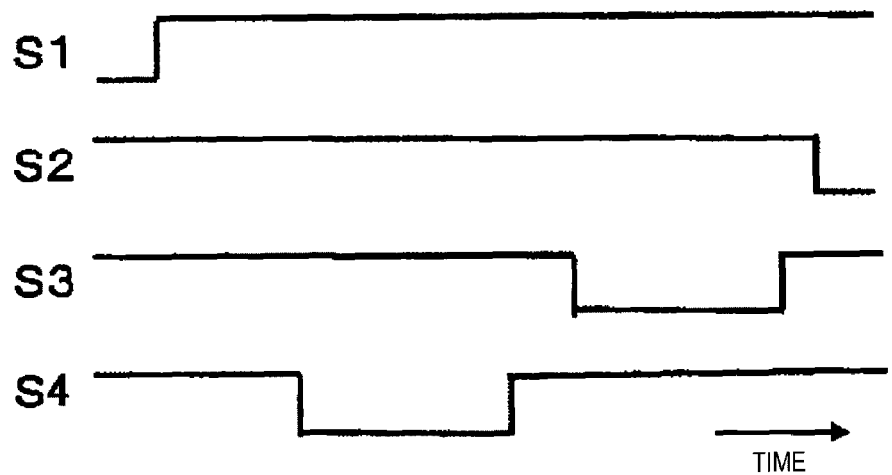
FIG. 8D is a signal waveform diagram corresponding to FIG. 8C.

When the LIDAR device 2 is tilted in the roll direction, the horizontal scanning lines S1 to S4 partially overlap the low reflectance tapes 94. Therefore, the detection signals are signals in which a position of a low signal level exists in a part of the detection signals. In FIG. 8C, the LIDAR device 2 is tilted to the upward right direction, and the horizontal scanning lines S1 to S4 have irregular timings and intervals in which the signal level decreases as shown in FIG. 8D. Therefore, by detecting the timings at which the signal level decreases, the roll direction of the LIDAR device 2 and the angle thereof can be detected.

Figure 9A:
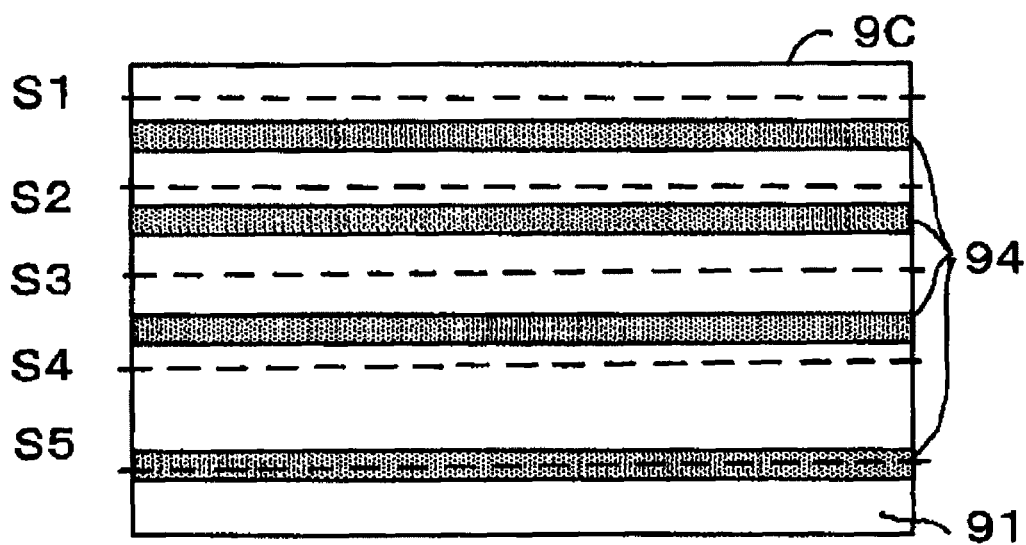
FIG. 9A is a schematic front view of the screen according to the third embodiment.

In addition, in the third embodiment, when the reference direction of the LIDAR device 2 is tilted in the pitch direction, the plurality of horizontal scanning lines are vertically moved relative to the plurality of low reflectance tapes 94. Therefore, for example, as shown in FIG. 9A, dimensions of intervals of the plurality of low reflectance tapes 94 in the up-down direction may change sequentially. In this example, the dimensions of the intervals are gradually increased from the top to the bottom.

Figure 9B:
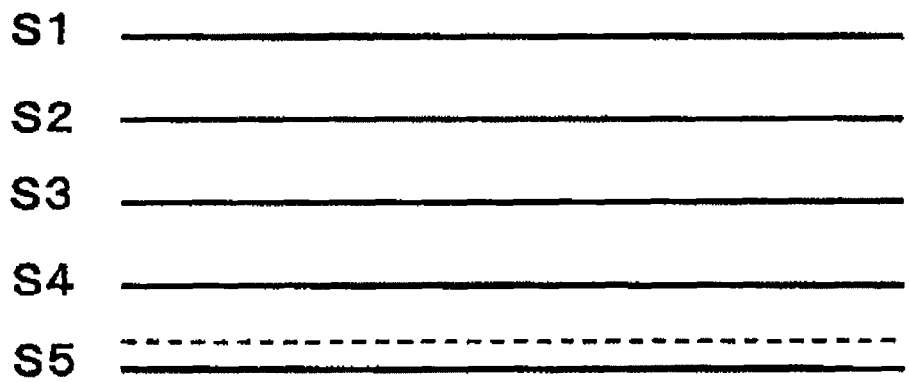
FIG. 9B is a signal waveform diagram corresponding to FIG. 9A.

In this case, when the reference direction of the LIDAR device 2 is directed to the target direction, as shown in FIG. 9B, the horizontal scanning lines S1 to S4 do not overlap the low reflectance tapes 94 and the detection signals are at the high level, but a horizontal scanning line S5 overlaps the low reflectance tape 94 and the detection signal is at a low level. Although not shown, when the reference direction of the LIDAR device 2 is tilted downward from a state of FIG. 9A and the horizontal scanning lines S1 and S2 overlap the low reflectance tapes 94, as shown in FIG. 9C, the detection signals of the horizontal scanning lines S1 and S2 are at the low level, and the horizontal scanning lines S3 to S5 that do not overlap the low reflectance tapes 94 are at the high level. Based on such a relative positional relationship between the horizontal scanning lines S1 to S5 and the low reflectance tapes 94, the angular error and the direction of the LIDAR device 2 in the pitch direction can be detected.

In the third embodiment, the actuator drive unit 72 of the diagnostic device 7 can perform the aiming adjustment in the roll direction of the headlamp HL by controlling the actuator 8 based on this angular error. In addition, the aiming adjustment in the pitch direction can be also performed. The angular error and the direction are displayed on the diagnostic device 7, and the aiming adjustment can be performed manually. In this case, the low reflectance tapes 94 of the surface 91 of the screen 9C are also detected by the horizontal scanning lines, a surface state of the screen 9C is detected, and the angular error is detected.

Although in the second and third embodiments, the column members having a lower reflectance or the low reflectance tapes are attached to the surface of the screen to reduce the reflectance of the laser light for horizontal scanning, on the contrary, column members having a higher reflectance or high reflectance tapes may be attached to the surface of the screen. In this case, as the detection signals by the LIDAR device, high level signals are output when the horizontal scanning lines intersect the column members or the high reflectance tapes. A portion provided on the surface 91 and having a reflectance different from that of the surface 91 may be referred to as a different reflection portion.

In the above description of the embodiments, the example in which the LIDAR device is applied to light distribution control of the headlamp, particularly the ADB control is shown. However, as described above, the LIDAR device used for the automatic driving control can be built in the headlamp or another lamp, and the aiming adjustment of the LIDAR device can be performed simultaneously with the aiming adjustment by the lamp.

The present application is based on a Japanese Patent Application No. 2018-088087 filed on May 1, 2018, the contents of which are incorporated herein by reference.

REFERENCE SIGNS LIST 1 lamp unit
2 LIDAR device
3 lamp housing
4 aiming mechanism
5 base plate
6 lamp ECU
7 diagnostic device
8 actuator
9, 9A, 9B, 9C screen
41 aiming screw
91 surface
92 column member (different reflection portion)
93, 94 low reflectance tape (different reflection portion)
100 CAN
HL headlamp
AD aiming adjustment apparatus

The invention claimed is:

1. An aiming adjustment method for adjusting a posture of a vehicle lamp provided with a LIDAR device, the aiming adjustment method comprising:
    providing a screen in front of the LIDAR device;
    detecting a state of a surface of the screen by the LIDAR device;
    detecting an angular error of the posture of the vehicle lamp based on a detection signal indicating the state of the surface; and
    correcting the posture of the vehicle lamp based on the angular error.

2. The aiming adjustment method for the vehicle lamp according to claim 1,
    wherein a surface of the screen facing the LIDAR device is inclined with respect to a vertical direction,
    wherein the detection signal is related to a distance between the LIDAR device and the screen, and
    wherein the angular error is detected based on a target distance set to the screen and the distance between the LIDAR device and the screen.

3. The aiming adjustment method for the vehicle lamp according to claim 1,
    wherein a different reflection portion is provided on the surface of the screen facing the LIDAR device, and
    wherein the angular error is detected based on a change timing of a signal level of the detection signal.

4. An aiming adjustment apparatus for adjusting a posture of a vehicle lamp provided with a LIDAR device, the aiming adjustment apparatus comprising:
    a screen provided in front of the LIDAR device; and
    a diagnostic device configured to detect an angular error of the posture of the vehicle lamp based on a detection signal detected by the LIDAR device, the detection signal indicating a state of a surface of the screen.

5. The aiming adjustment apparatus for the vehicle lamp according to claim 4,
    wherein the diagnostic device includes an actuator configured to adjust the posture of the vehicle lamp based on the detected angular error.

6. The aiming adjustment apparatus for the vehicle lamp according to claim 4,
    wherein the surface of the screen facing the LIDAR device is inclined with respect to a vertical direction,
    wherein the detection signal is related to a distance between the LIDAR device and the screen, and
    wherein the diagnostic device is configured to detect the angular error based on a target distance set to the screen and the distance between the LIDAR device and the screen.

7. The aiming adjustment apparatus for the vehicle lamp according to claim 4,
    wherein a different reflection portion is provided on the surface of the screen facing the LIDAR device, and
    wherein the diagnostic device is configured to detect the angular error based on a change timing of a signal level of the detection signal.

* * * * *